(12) United States Patent
Kahalon et al.

(10) Patent No.: US 12,360,894 B2
(45) Date of Patent: Jul. 15, 2025

(54) PROGRAMMABLE CORE INTEGRATED WITH HARDWARE PIPELINE OF NETWORK INTERFACE DEVICE

(71) Applicant: Mellanox Technologies, Ltd., Yokneam (IL)

(72) Inventors: Omri Kahalon, Yehud (IL); Avi Urman, Yokneam (IL); Ilan Pardo, Ramat-Hasharon (IL); Omer Cohen, Yokneam-Ilit (IL); Sayantan Sur, Cary, NC (US); Barak Biber, Haifa (IL); Saar Tarnopolsky, Haifa (IL); Ariel Shahar, Jerusalem (IL)

(73) Assignee: Mellanox Technologies, Ltd., Yokneam (IL)

( * ) Notice: Subject to any disclaimer, the term of this patent is extended or adjusted under 35 U.S.C. 154(b) by 387 days.

(21) Appl. No.: 17/958,697

(22) Filed: Oct. 3, 2022

(65) Prior Publication Data

US 2023/0418746 A1    Dec. 28, 2023

Related U.S. Application Data

(60) Provisional application No. 63/355,974, filed on Jun. 27, 2022.

(51) Int. Cl.
| | |
|---|---|
| *G06F 12/0802* | (2016.01) |
| *G06F 9/46* | (2006.01) |
| *G06F 9/48* | (2006.01) |
| *G06F 12/0811* | (2016.01) |
| *G06F 12/0846* | (2016.01) |
| *G06F 12/0888* | (2016.01) |
| *H04L 45/74* | (2022.01) |

(52) U.S. Cl.
CPC ......... *G06F 12/0802* (2013.01); *G06F 9/461* (2013.01); *G06F 9/4881* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 9,596,324 B2 * | 3/2017 | Hass | G06F 9/3851 |
| 11,122,115 B1 * | 9/2021 | Sagie | H04L 47/2441 |

(Continued)

OTHER PUBLICATIONS

Galles, et al., "Pensado Distributed Services Architecture," Theme Article: Hot Chips, IEEE, Mar./Apr. 2021, pp. 43-49, Milpitas, California.

*Primary Examiner* — Mustafa A Amin
(74) *Attorney, Agent, or Firm* — Lowenstein Sandler LLP

(57) ABSTRACT

A method includes receiving a network packet into a hardware pipeline of a network device; parsing and retrieving information of the network packet; determining, by the hardware pipeline, a packet-processing action to be performed by matching the information to a data structure of a set of flow data structures; sending, by the hardware pipeline, an action request to a programmable core, the action request being populated with data to trigger the programmable core to execute a hardware thread to perform a job, which is associated with the packet-processing action and that generates contextual data; retrieving the contextual data updated by the programmable core; and integrating the contextual data into performing the packet-processing action.

22 Claims, 7 Drawing Sheets

(56) References Cited

U.S. PATENT DOCUMENTS

| | | | |
|---|---|---|---|
| 11,375,006 B1* | 6/2022 | Shivanna | H04L 41/5051 |
| 11,489,773 B2* | 11/2022 | Galles | H04L 49/109 |
| 2003/0135351 A1* | 7/2003 | Wilkinson, III | G06F 15/8053 |
| | | | 702/186 |
| 2016/0283283 A1* | 9/2016 | Jung | H04L 67/1004 |
| 2017/0171362 A1* | 6/2017 | Bolotov | H04L 63/0263 |
| 2018/0191632 A1* | 7/2018 | Biederman | H04L 47/6275 |
| 2019/0289102 A1* | 9/2019 | Goel | H04L 45/74591 |
| 2020/0336425 A1* | 10/2020 | Galles | H04L 49/109 |
| 2022/0261283 A1* | 8/2022 | Hardwick | H04L 47/82 |

* cited by examiner

PROGRAMMABLE CORE INTEGRATED WITH HARDWARE PIPELINE OF NETWORK INTERFACE DEVICE

REFERENCE TO RELATED APPLICATION

This application claims the benefit of U.S. Provisional Patent Application No. 63/355,974, filed Jun. 27, 2022, the entirety of which is incorporated herein by reference.

TECHNICAL FIELD

At least one embodiment pertains to processing resources used to perform and facilitate network communication. For example, at least one embodiment pertains to technology for a programmable core integrated with a hardware pipeline of a network interface device.

BACKGROUND

Network devices (e.g., switches, routers, hubs, endpoints, and the like) are being designed with not only a network interface card (NIC), but also significant processing capability in a host processing device, e.g., a central processing unit (CPU), an accelerated processing unit (APU), or the like, which is designed for high data transfer applications and increased throughput. As a result, network devices have been required to take on additional packet processing capability that includes parsing packets and using information from the packets to direct (or steer) the packets to an intended destination, e.g., out of a particular port. The processing further includes a number of computations, such as match-action, decapsulation, encapsulation, checksum, generation of digests, and the like operations.

Modern network devices have used programmable cores in order to provide a growing portion of the packet processing capability because of the flexibility of being programmable for additional intelligent tasks that may be required. The challenge involved with using programmable cores for the increased number of intelligent tasks is that software runs slower than hardware and tends to decrease both speed of data transfer and throughput capability of intelligent NICs associated with modern network devices.

BRIEF DESCRIPTION OF DRAWINGS

Various embodiments in accordance with the present disclosure will be described with reference to the drawings, in which.

DETAILED DESCRIPTION

Figure 1A:
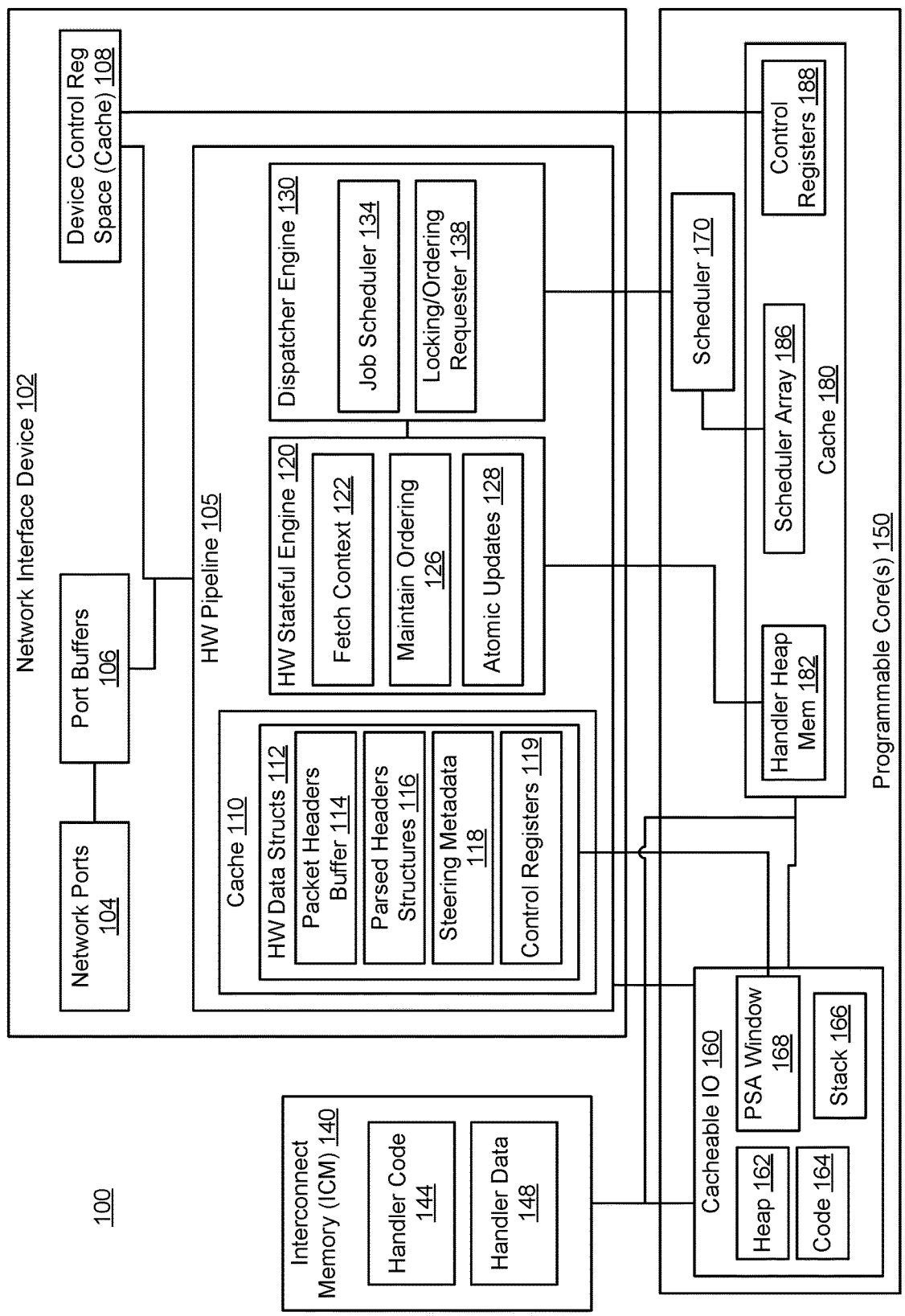
FIG. 1A is a block diagram of a network device that integrates a network interface device with one or more programmable cores, in accordance with at least some embodiments.

As described above, there are disadvantages in speed and throughput of data (e.g., network packet flow) passing through a network device when relying on programmable cores. Hardware engines, e.g., that are located within a hardware pipeline of an intelligent network device, are much faster, but allow very little programmability, employing circuitry and logic at a lower level (such as state engines) to perform packet processing operations. Thus, relying primarily on one unbalanced design, such as programmable cores, or another design, such as a hardware pipeline, will introduce either performance issues or inflexibility, respectively.

Aspects and embodiments of the present disclosure address the deficiencies of relying too much on programmable cores by integrating hardware pipeline functionality tightly with programmable operations of programmable cores, thus achieving a level of programmability while still relying heavily on the hardware pipeline. For example, fast programmable actions can be performed by an in-packet hardware pipeline that extends the steering actions and parsing capabilities of the network device. The hardware pipeline may further perform hardware scheduling and data prefetch that improves performance of the overall network device.

In various embodiments, the network device design further provides at least a twofold hardware acceleration by one or more programmable cores. First, the programmable cores may have access to hardware parser results and steering metadata generated by the hardware pipeline, and thus can know what the hardware pipeline knows without causing network packets to be replayed. Second, the programmable cores may accelerate computation by selectively requesting the hardware pipeline to perform operation(s) associated with packet processing, e.g., inserting bytes into the network packet, removing bytes from the network packet, performing a cyclic redundancy check (CRC) computation of the network packet, generating a digest of the network packet, or performing a match operation with information derived from the network packet.

In various embodiments, by way of example, a network device according to the present disclosure may include a set of port buffers to receive network packets, at least one programmable core, and a hardware pipeline coupled to the set of port buffers and the programmable core. In these embodiments, the hardware pipeline includes a cache (e.g., fast-access memory) to store a set of flow data structures that respectively correspond to multiple actions, a parser engine to parse and retrieve information from the network packet, and a set of hardware engines. In at least some embodiments, the set of hardware engines is configured to determine a packet-processing action to be performed by matching the information to at least one data structure of the set of flow data structures. The set of hardware engines may send an action request to the programmable core, the action request being populated with data to trigger the programmable core to execute a hardware thread to perform a job. The job, for example, may be associated with the packet-processing action and generate contextual data. The set of hardware engines may further retrieve the contextual data updated by the programmable core and integrate the contextual data into performing the packet-processing action.

Advantages of the present disclosure include but are not limited to improving the speed and throughput of network packets through the network device. The tightly integrated accelerator design may also minimize initialization time through data prefetch and further improve speed and throughput of data packets through hardware scheduling. Other advantages will be apparent to those skilled in the art of intelligent network devices discussed hereinafter.

FIG. 1A is a block diagram of a network device 100 that integrates a network interface device 102 with one or more programmable core(s) 150, in accordance with at least some embodiments. In at least some embodiments, the network device 100 further includes a interconnect memory (ICM) 140 coupled to the programmable core(s) 150. The ICM 140 may be understood as main memory of the network device 100, such as dynamic random access memory (DRAM) or the like. In these embodiments, the ICM 140 may store handler code 144 and handler data 148 for the functioning of an operating system (OS) and applications of the programmable core(s) 150. In some embodiments, the network device 100 is a data processing unit (DPU) alone or in combination with a switch, a router, a hub, or the like.

In various embodiments, the programmable core(s) 150 include a cacheable IO 160, cache 180, and a scheduler 170, which may be executed by circuitry and/or logic integrated within the programmable core(s) 150, e.g., on the same die as the programmable core(s) 150. The cacheable IO 160 may be a dedicated area or region of the cache 180 dedicated to IO transactions or may be separate dedicated cache memory for the IO transactions, or a combination thereof. The cache 180 may be L1, L2, L3, other higher-level caches, or a combination thereof, associated with programmable processing of the programmable core(s) 150. The cache 180 and the cacheable IO 160 or similar region of cache may be memory-mapped to the ICM 140 in some embodiments.

In these embodiments, the cacheable IO 160 includes, but is not limited to, a heap 162, code 164, a stack 166, and a programmable window 168, which may also be known as a programmable steering agent (PSA) window of cacheable IO 160. The code 164 may be executed to run the OS and applications of the programmable core(s) 150 that perform particular packet-processing and user operations. The heap 162 may be cached to maintain a state of a function before performing difference invocations or other related computations. The stack 166 may be a call stack, for example, that is used to track and buffer data packets that are used for local computation of the programmable core(s) 150. The programmable window 168 of the cacheable IO 160 may also function like a heap that is shared with or memory-mapped to a hardware pipeline 105, as will be discussed in more detail.

In at least some embodiments, the cache 180 is fast-access memory that can include or store, for example, a handler heap memory 182, a scheduler array 186, and control registers 188. For example, the cache 180 may be static random access memory (SRAM), tightly coupled memory, or other fast-access volatile memory that is mapped to the ICM 140. In some embodiments, handler heap memory 182 stores a stateful context associated with an application executed by a hardware thread of the programmable core(s) 150 to aid in processing network packets. Additional aspects of the programmable core(s) 150 will be discussed hereinafter.

Figure 1B:
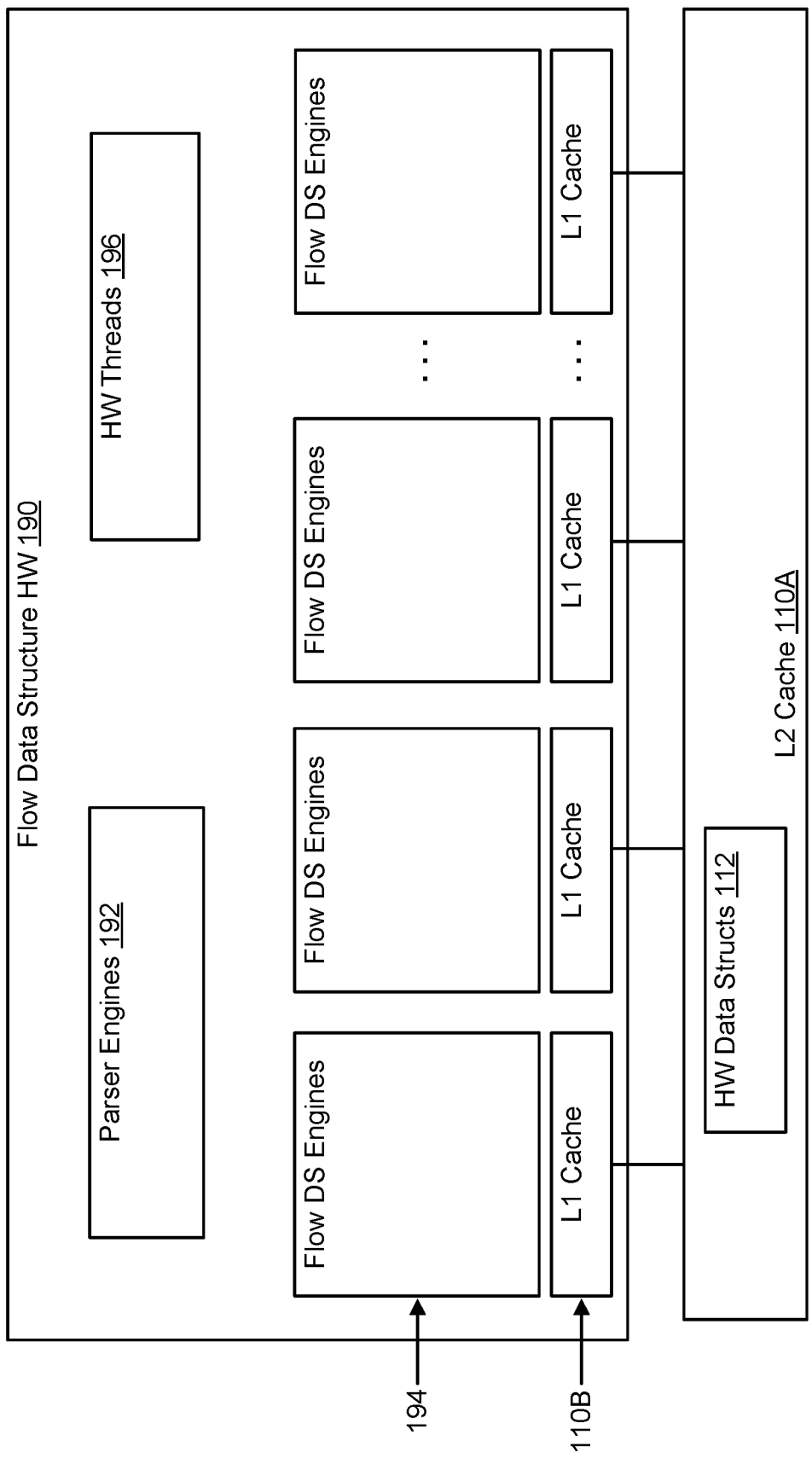
FIG. 1B is a block diagram of flow data structure hardware that is included in the hardware pipeline of the network interface device, in accordance with at least some embodiments.

In some embodiments, the network interface device 102 is a smart NIC. In these embodiments, the network interface device 102 includes, but is not limited to, a set of network ports 104 that are coupled to physical media of a network or Internet, a set of port buffers 106 to receive network packets from the network ports 104, device control register space 108 (e.g., within cache or other local memory) that are coupled to the control registers 188 on the cache 180, and a hardware pipeline 105. In at least some embodiments, the hardware pipeline includes a cache 110 and a set of hardware engines, including a hardware stateful engine 120, a dispatcher engine 130, and flow data structure (DS) engine 194 (FIG. 1B). The cache 110 may be memory mapped to the programmable window 168 of the cacheable IO 160. In these embodiments, the cache 110 is configured to cache hardware data structures 112 that, for example, store a packet headers buffer 114, parsed headers structures 116, steering metadata 118, and control registers 119, the latter of which store various parameters.

With additional reference to FIG. 1B, FIG. 1B is a block diagram of flow data structure hardware 190 that is included in the hardware pipeline 105 of the network interface device 102, in accordance with at least some embodiments. In these embodiments, the cache 110A includes an L2 cache 110A and the flow data structure hardware 190 includes an L1 cache 110B, which is at least a portion of a multi-level cache. In some embodiments, the hardware data structures 112 are stored in the L2 cache 110A, but can be further buffered into the L1 cache 110B as well.

In various embodiments, the flow data structure hardware 190 further includes, but is not limited to, multiple parser engines 192, multiple hardware threads 196, and the set of flow data DS engines 194. The multiple parser engines 192 may be configured to parse incoming network packets to retrieve data and other information encoded within the packets. The multiple hardware threads 196 may be responsible to coordinate execution of the packet processing pipeline of the hardware pipeline 105, e.g., in order to correctly perform actions associated with processing the network packets, to include encapsulating some packets for further transmission (although destination ports are not illustrated for simplicity). The set of flow DS engines 194 may be hardware engines employed to determine what actions are to be carried out depending on information parsed from the network packets (see FIGS. 2A-2B).

Figure 2A:
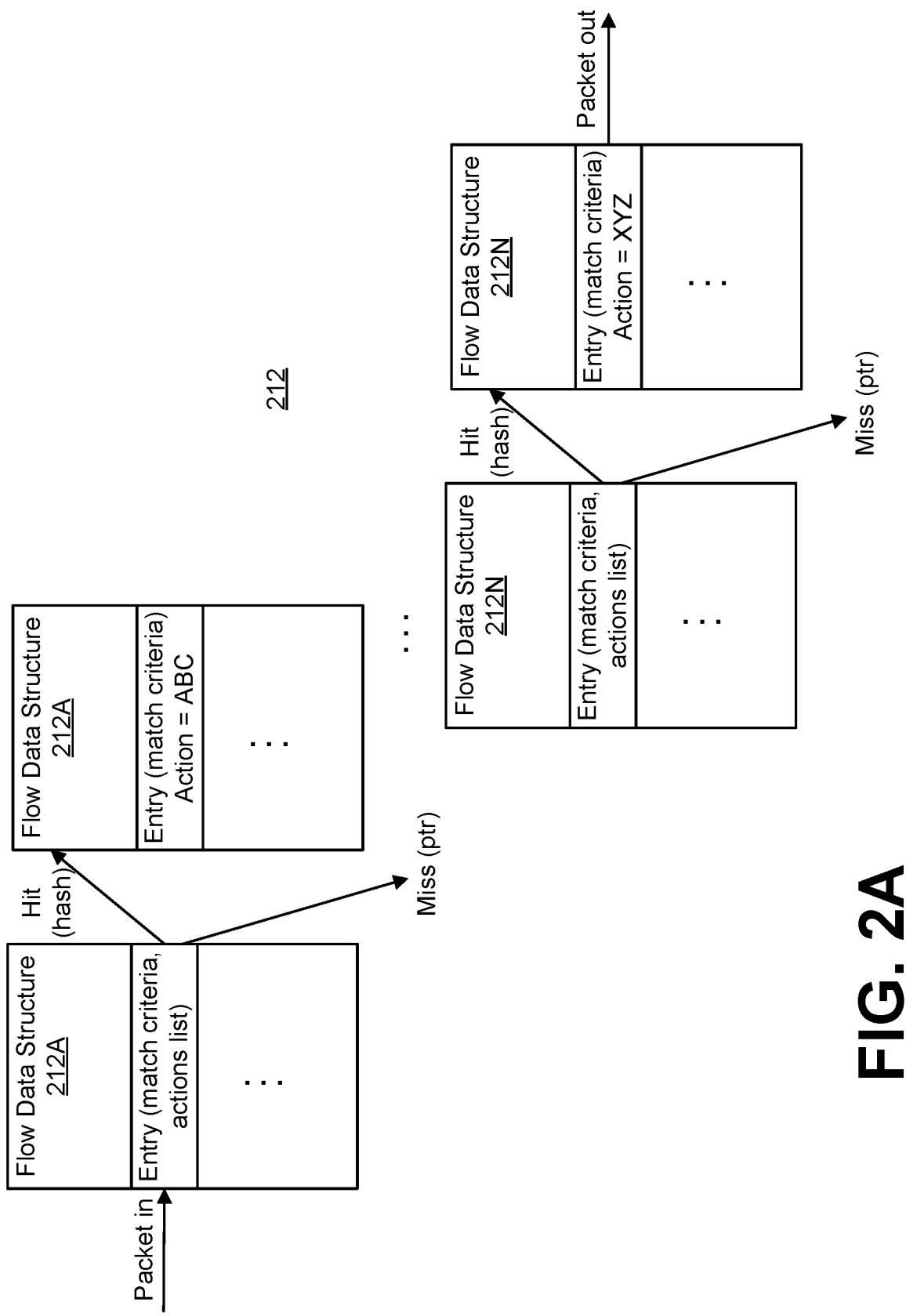
FIG. 2A is a flow diagram of a match-action functionality from a set of flow data structures, in accordance with at least some embodiments.

FIG. 2A is a flow diagram of a match-action functionality from a set of flow data structures 212, in accordance with at least some embodiments. In some embodiments, the set of flow data structures 212 are allocated within the ICM 140, but are cached within the set of hardware data structures 112 on the multi-level cache, e.g., the L2 cache 110A and the L1 cache 110B. In at least some embodiments, the set of flow data structures 212 includes mutually-linked tables based on match-action criteria. Software running on the programmable core may program the set of flow data structures with this match-action criteria in order to handle incoming network packets in a particular way. For example, each entry in the set of flow data structures defines a criterion for any field from the packet headers (including flexible headers) and a corresponding set of actions that is to be performed upon matching the match criterion.

In various embodiments, one of the flow DS engines 194 performs a lookup within the set of flow data structures 212 to match information from the packet to criteria listed in a flow data structure to find the next entry. The flow DS engine 194 may then look up the entry in the cache 110, and if there is a miss, the entry is fetched from the ICM 140. More specifically, in the illustrated embodiment, the flow DS engines 194 attempts to match information parsed from the packet (which may be hashed version of that information for security) to match the criteria of a first flow data structure 212A. If the flow DS engine 194 misses, the flow DS engine 194 follows another pointer to look up the entry in the cache 110. If there is a hit, the flow DS engine 194 retrieves an action (e.g., ABC) from the first flow data structure 212A. Performing this action by the hardware pipeline 105 will be discussed in more detail later.

In various embodiments, this action is a packet-processing action such as to modify a transport control protocol (TCP) sequence, inject code into a kernel of a host device, or translate an input port of the network packet to an output port of a translated network packet, which are merely listed as examples. For example, if modifying the TCP sequence, the action may have to involve at least determining most-recent acknowledgment (ACK) sequence numbers that are saved into a context, which are then used to update the TCP sequence for the network packet. To perform this action, the HW pipeline 105 may set a pointer to the TCP offset in the packet headers buffer 114. Thus, the HW pipeline 105 would not need to parse the header of the network packet again to determine this information. Performing the packet-processing action may result in using the TCP offset to update a base value for each of the sequence number, and the acknowledgment number within the packet headers buffer 114.

In at least some embodiments, the flow DS engine 194 further determines multiple consecutive actions to be performed by matching the information parsed from the network packet to mutually-linking data structures of the set of flow data structures, the multiple consecutive actions associated with processing and forwarding the network packet. For example, the flow DS engine 194 may employ additional information parsed from the network packet or the action matched within the first flow data structure 212 to link to a subsequent flow data structure 212N, at which point matching operations are repeated as before. If there is a hit with a subsequent match criterion to the information (or action), then the flow DS engine 194 retrieves a second action (e.g., XYZ) that is also to be performed in handling the network packet.

Figure 2B:
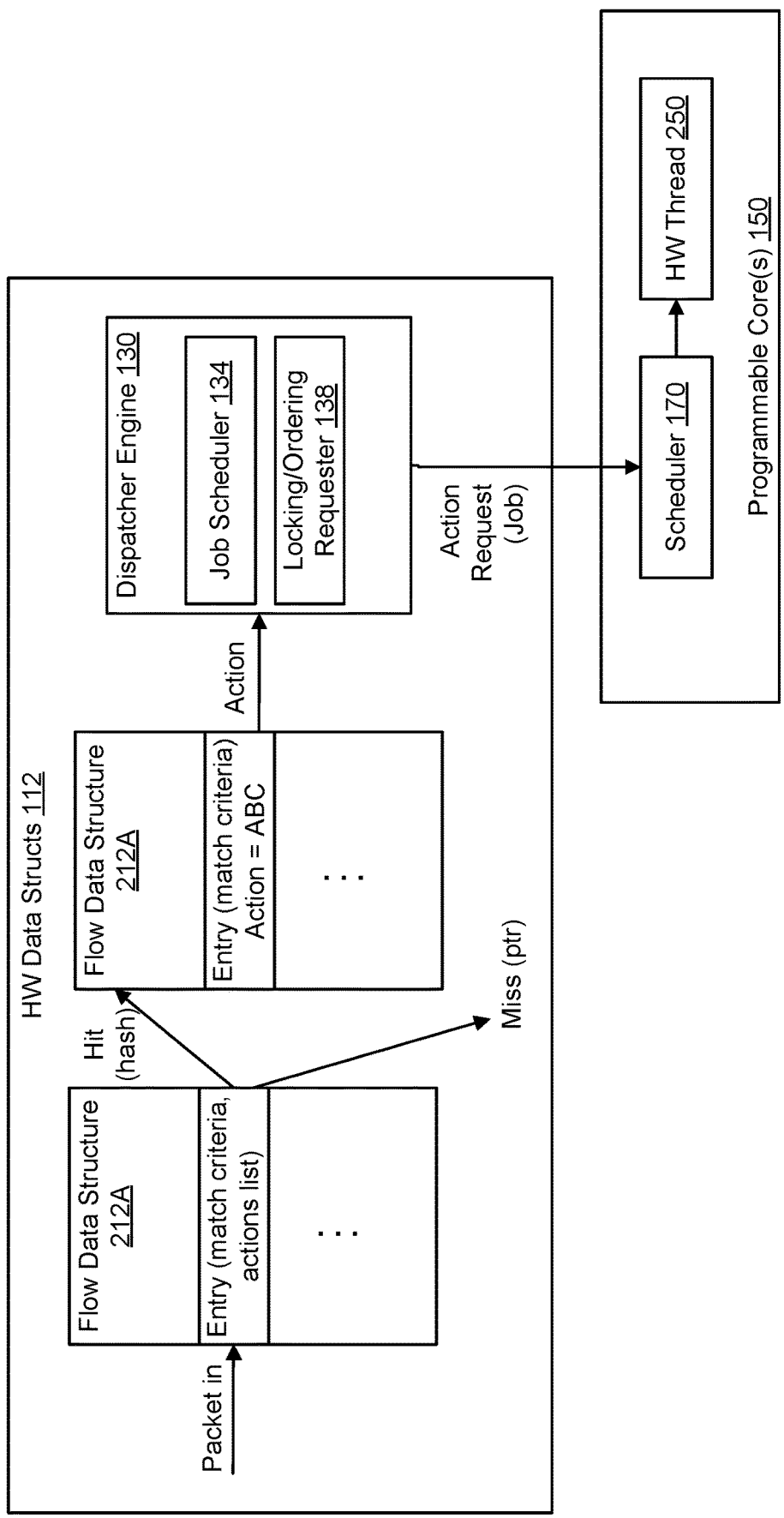
FIG. 2B is a hardware-based flow diagram of integration of the set of flow data structures with schedulers in order to request a programmable core to perform one or more jobs, in accordance with at least some embodiments.

FIG. 2B is a hardware-based flow diagram of integration of the set of flow data structures 212 with schedulers in order to request a programmable core to perform one or more jobs, in accordance with at least some embodiments. In these embodiments, and with continued reference to FIG. 1A, the dispatcher engine 130 includes a job scheduler 134 and a locking-ordering requester 138. In at least some embodiments, the dispatcher engine 130 (e.g., the job scheduler 134) sends an action request to the programmable core based on the action (e.g., ABC) identified by the flow DS engine 194 (FIG. 2A). In some embodiments, the action request is populated with data to trigger the programmable core 150 to execute a hardware thread 250 (e.g., program or executable set of instructions) to perform at least one job. The data may include a descriptor that identifies the job, for example. In these embodiments, the job is associated with the packet-processing action and causes the hardware thread of the programmable core 150 to generate contextual data. The dispatcher engine 130 may also set an interrupt type to signal the programmable core 150 a manner in which to perform the job, e.g., including a trigger of a timer for a watchdog mechanism.

In at least some embodiments, the hardware engine 105 retrieves the contextual data updated by the programmable core 150, e.g., from the programmable window 168 of the cacheable IO 160 where a slice context (e.g., at least a portion of contextual data that makes up a packet processing thread specific to a network packet) is memory-mapped to the hardware data structures 112, as will be discussed in more detail with reference to FIG. 3. In these embodiments, the hardware pipeline 105 retrieves the contextual data produced by the programmable core 150 executing the job and uses the contextual data in performing the packet-processing action. Further, in at least some embodiments, the contextual data is located within the slice context of the hardware thread 250 and includes a program counter for a target application associated with the hardware thread 250 and/or a pointer to the stack 166 associated with updating the slice context. In this way, the hardware pipeline can trigger the programmable core to execute the hardware thread 250 to perform one or more jobs in obtaining contextual data for the packet-processing pipeline that may be needed, but the hardware pipeline is not programmed to generate.

In these embodiments, the dispatcher engine 130 (e.g., the job scheduler 134) may also request the scheduler 170 operating on the programmable core 150 for a free hardware thread before sending the action request. The scheduler 170 identifies an available hardware thread and sets the hardware thread 250 as in use (IN_USE). Thereafter, the dispatcher engine 130 may further expose the slice context, e.g., stored in the cache 110, as available to the hardware thread 250. In some embodiments, the dispatcher engine 130 further loads an application into the cache 180, if necessary, and sets relevant registers within the control registers 188 of the programmable cores 150. These set register values (or the setting values within the registers) may cause the hardware thread 250 to point to the correct application and slice context, which are already loaded in the cache 180 and the programmable window 168, for example. The dispatcher engine 130 may further prefetch data, if needed, that is associated with a context of packet processing specified by the first flow data structure 212A.

Figure 3:
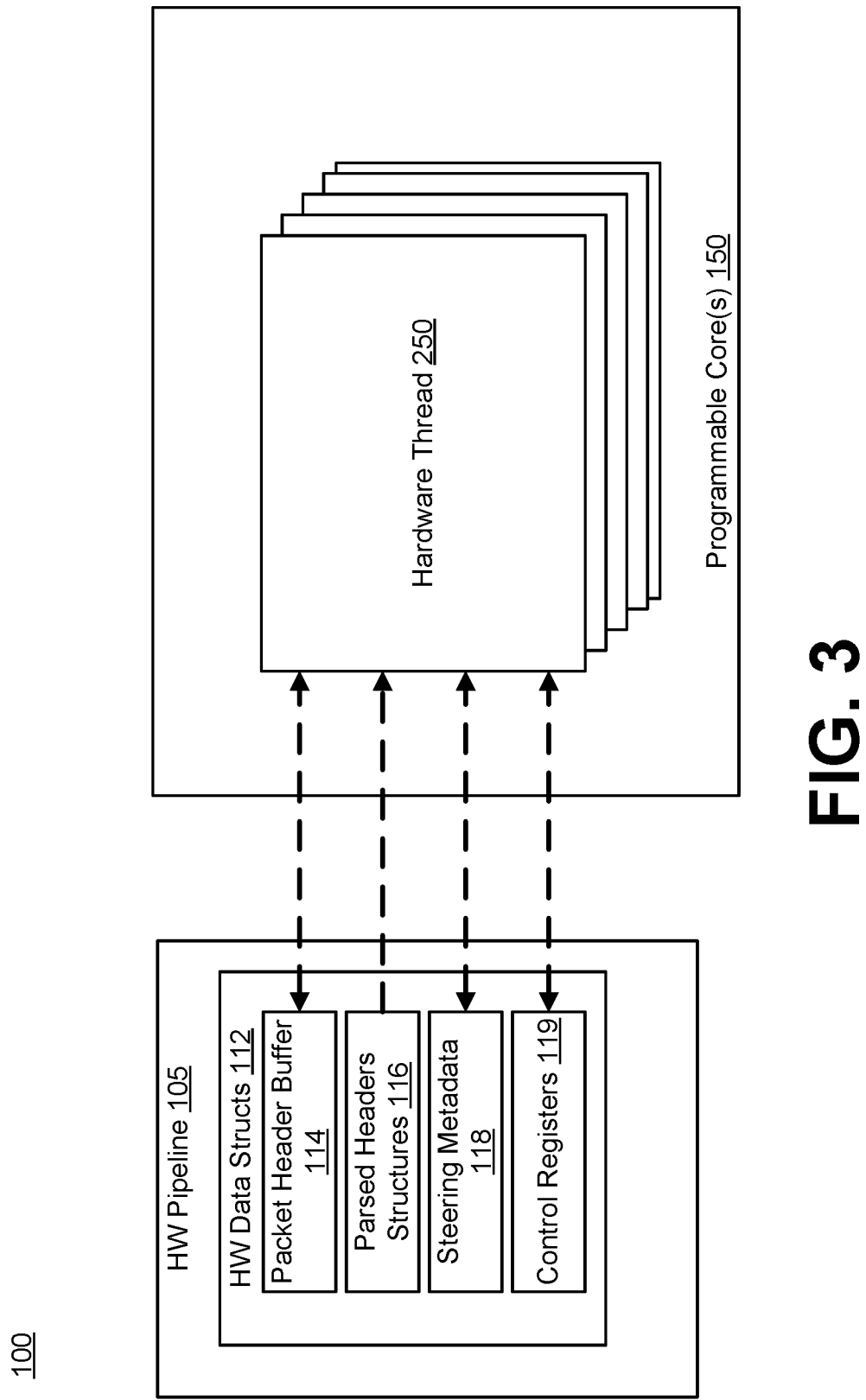
FIG. 3 is a block diagram of a network device in which the set of data structures of a hardware pipeline directly shares contextual data with a hardware thread being executed on a programmable core, in accordance with at least some embodiments.

FIG. 3 is a block diagram of the network device 100 in which the set of data structures 112 of a hardware pipeline 105 directly shares contextual data with the hardware thread 250 (FIG. 2B) being executed on a programmable core, in accordance with at least some embodiments. As explained, the slice context of the hardware thread 250 may be memory-mapped between the programmable window 168 and the hardware data structures 112 of the cache 110 of the hardware pipeline 105. The stack 166 may interact with (insert data to and retrieve data from) the programmable window 168.

In various embodiments, this slice context includes, but is not limited to, the packet headers buffer 114, the parsed header structure 116, the steering metadata 118, and control registers 119. The packet headers buffer 114 may include raw data from the packet header of network packets, including information about the packet. The programmable core may be readable and writeable by the programmable cores 150, and thus can update the headers of the network packets being processed by the hardware pipeline 105.

In these embodiments, the parsed headers structure 116 is populated by the parser engines 192 and is readable by the programmable core 150 (e.g., is not also writeable by the programmable core 150). The parsed headers structure 116 may be updated between processing cycles from the packet headers buffer 114.

In these embodiments, the steering metadata 118 is associated with determining the packet-processing action from the information. The steering metadata may be readable and writeable by the programmable core, and include metadata associated with steering or directing the network packets to particular destinations, for example.

In these embodiments, the control registers 119 store parameters associated with performing the packet-processing action, for example. The control registers 119, and thus these parameters, may be readable and writeable by the programmable core. These parameters may have no defined structure, but may be designed to trigger the hardware thread 250 executing on the programmable core 150.

Figure 4:
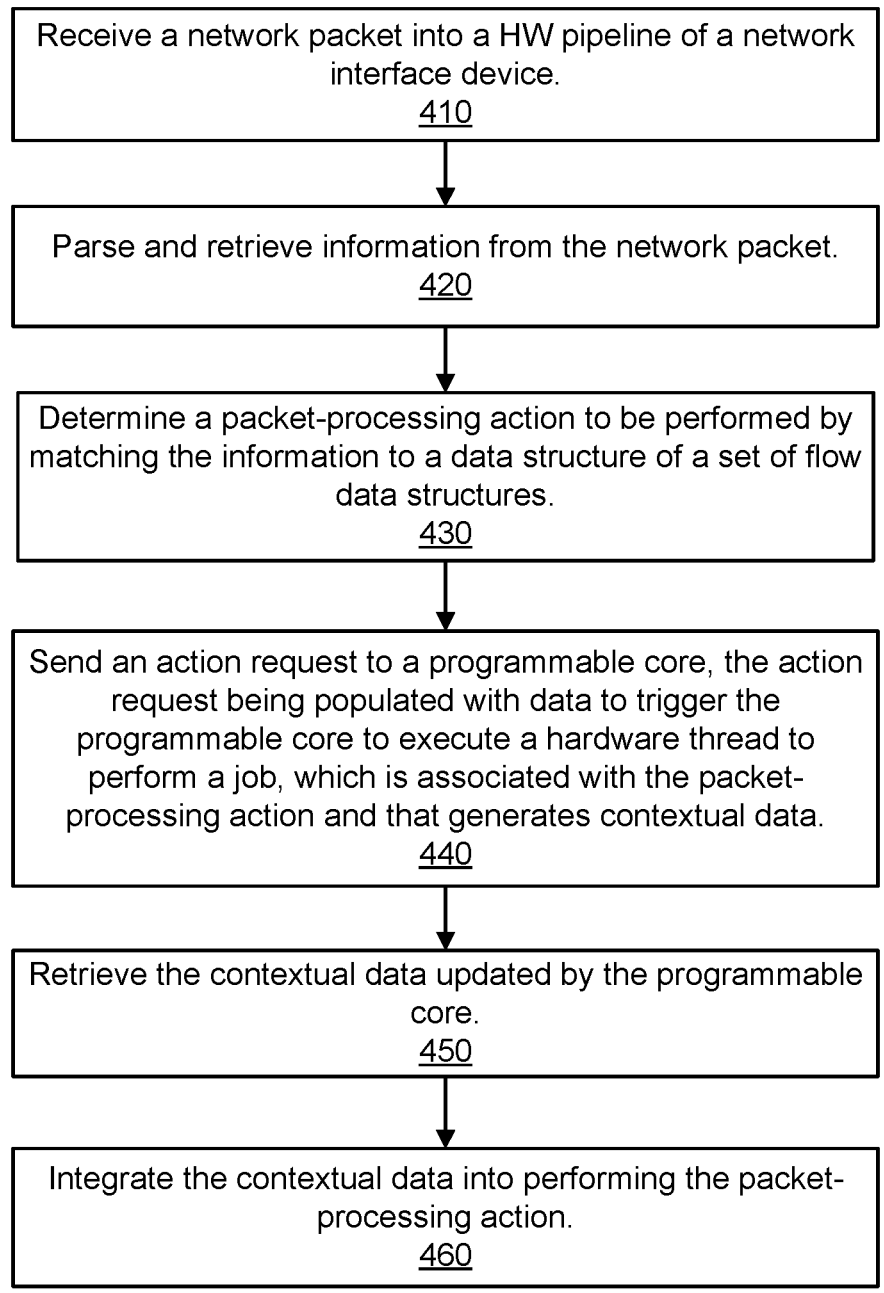
FIG. 4 is a flow diagram of a method for a hardware pipeline of a network interface device interacting with a programmable core to accelerate packet processing, in accordance with at least some embodiments.

FIG. 4 is a flow diagram of a method 400 for a hardware pipeline of a network interface device interacting with a programmable core to accelerate packet processing, in accordance with at least some embodiments. The method 400 can be performed by processing logic comprising hardware, software, firmware, or any combination thereof. In at least one embodiment, the method 400 is performed by the network device 100 of FIGS. 1A-1B, and particularly by the hardware pipeline 105 in relation to at least one of the programmable cores 150.

At operation 410, the processing logic receives a network packet into the hardware pipeline 105 of a network device 100. For example, the receiving may be through the network ports 104 and the port buffers 106 into the hardware pipeline 105.

At operation 420, the hardware pipeline 105 parses and retrieves information from the network packet. This information may include steering metadata and other data that the hardware pipeline can use to determine how to handle the network packet, including whether any contextual data is needed from the programmable core 150.

At operation 430, the hardware pipeline 105 determines a packet-processing action to be performed by matching the information to a data structure of a set of flow data structures, which was explained in detail with reference to FIGS. 2A-2B.

At operation 440, the hardware pipeline 105 sends an action request to a programmable core 150, the action request being populated with data to trigger the programmable core to execute a hardware thread to perform a job, which is associated with the packet-processing action and that generates contextual data. This operation is discussed in more detail with reference to FIG. 2B.

At operation 450, the hardware pipeline 105 retrieves the contextual data updated by the programmable core, as discussed previously with reference to FIG. 2B and FIG. 3. At operation 460, the hardware pipeline 105 integrates the contextual data into performing the packet-processing action.

With additional reference to FIG. 1A, the hardware stateful engine 120 includes but is not limited to hardware modules including a fetch context module 122, a maintain ordering module 126, and an atomic updates module 128. The fetch context module 122 may be configured to fetch a stateful context from the handler heap memory 182 of the programmable core 150. In certain programming languages, a heap is an area of pre-reserved computer main memory (e.g., here, the ICM 140) that an application process can use to store data in some variable amount that will not be known until the program is running. The OS itself may not be aware of the data in this handler heap memory 182.

In various embodiments, the stateful context may include different processing states associated with the application (or handler) being executed by the processing core 150 to handle processing of the network packet. In other words, these states and optional external data (e.g., that may be buffered in the slice context) may be needed in order to process the network packet in addition to the information parsed and retrieved from the network packet itself. As just one example, the stateful context may be derived from a database (or other data structure) that determines a destination port based on information associated with an incoming network port or some other identifier located in the packet header. More specifically, the database may include port-routing information as to between an arrival port and a destination port. Further examples of the stateful may context include a sequence number and an acknowledgment sequence number. Any new contextual information may be written into a new (or updated) network packet that is forwarded to the destination port.

In these embodiments, the maintain ordering module 126 maintain ordering of multiple jobs to be performed by the programmable core in performing the packet-processing action. In these embodiments, the atomic updates module 128 facilitates atomic updates to the stateful context and the ordering of the multiple jobs. An atomic update is one in which all relevant states or information are updated at the same time, which can be a desirable feature for purposes of timing the availability of data at the same time, for example.

In these embodiments, the dispatcher engine 130 (e.g., the job scheduler 134) schedules a job to be performed by the programmable core 150. Further, the locking-ordering requester 138 requests that the hardware stateful engine 120 perform at least one of locking one or more of the multiple jobs or ordering the multiple jobs to facilitate the atomic updates. This locking, ordering, and performing of atomic updates may facilitate in-order scheduling, as will be discussed in more detail with reference to FIG. 5.

Figure 5:
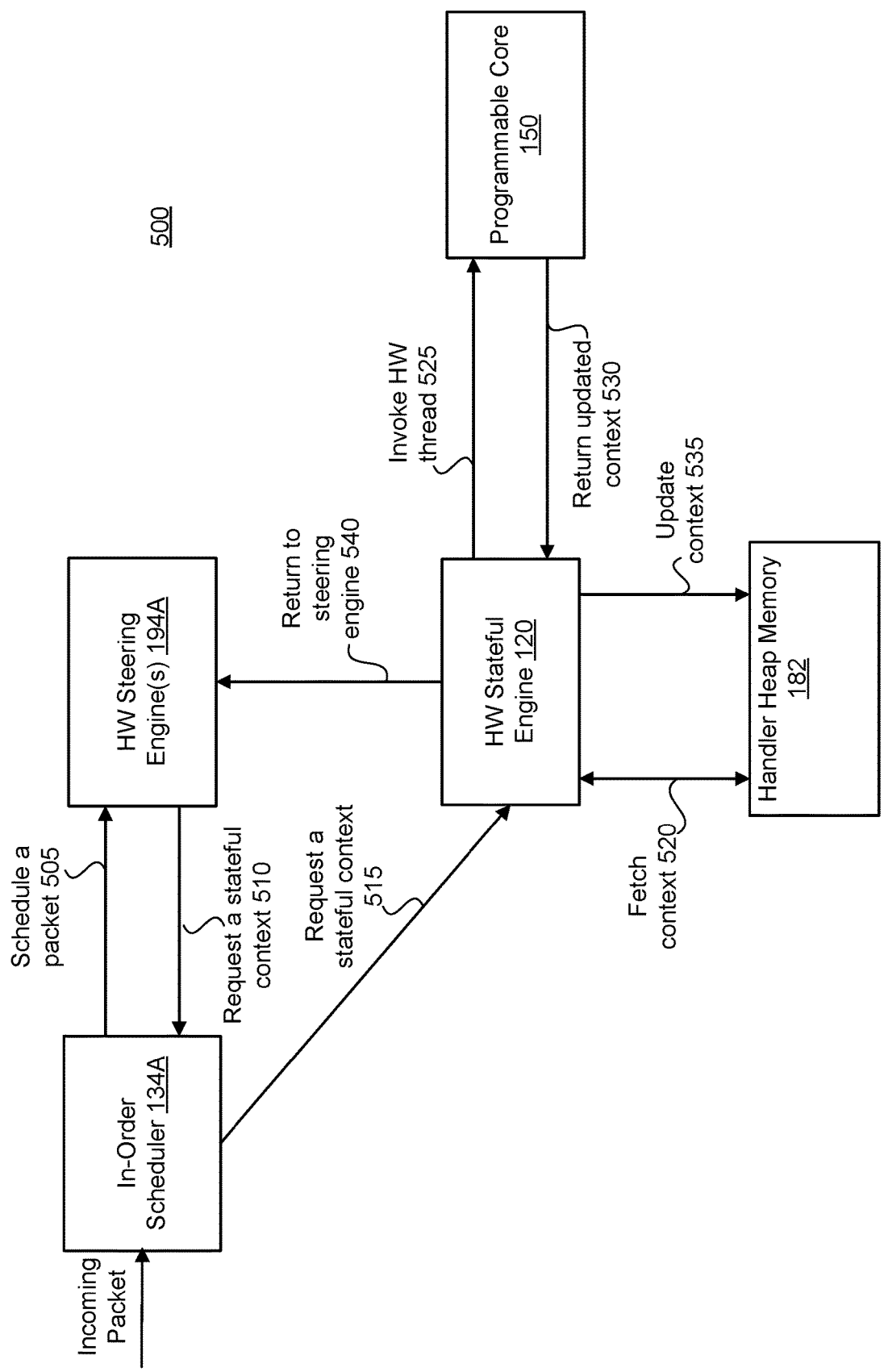
FIG. 5 is a hardware-based flow diagram of a method for in-order scheduling between the hardware pipeline and the programmable core, in accordance with at least some embodiments.

FIG. 5 is a hardware-based flow diagram of a method 500 for in-order scheduling between the hardware pipeline 105 and the programmable core 150, in accordance with at least some embodiments. The accesses illustrated in FIG. 5 may be atomic and in-order. In these embodiments, the network device 100 includes an in-order scheduler 134A, which may, for example, be integrated within the job scheduler 134. In these embodiments, the network device 100 includes hardware (HW) steering engine(s) 194A, which are also located within the hardware pipeline 105. In some embodiments, the HW steering engine(s) 194 include or are coupled to the flow DS engine 194 (FIG. 2). Thus, these features of the hardware pipeline 105 may interact with the programmable core 150, as illustrated.

At operation 505, the in-order scheduler 134A schedules a network packet 505 to be processed by the hardware steering engine(s) 194A, which may include one or more of the flow DS engines 194. At operation 510, the HW steering engine(s) 194A requests a stateful context from the in-order scheduler 134A. In response to that request, at operation 515, the in-order scheduler 134A requests the stateful context from the HW stateful engine 120.

In response to the request from the in-order scheduler 134A, at operation 520, the HW stateful engine 120 fetches a stateful context from the handler heap memory 182. Further, at operation 525, the HW stateful engine 120 (e.g., via the job scheduler 134), invokes a hardware thread of the programmable core 150 in order to obtain the most recent states of the stateful context. This hardware thread may be the hardware thread 250 discussed previously with reference to FIG. 2B. At operation 530, the programmable core 150 returns an updated stateful context to the HW stateful engine 120.

In some embodiments, the updated stateful context is made available to the HW stateful engine 120 via the handler heap memory 182. In other embodiments, at operation 530, the HW stateful engine 120 receives the updated stateful context directly from the programmable core 150 and, at operation 535, updates the stateful context stored in the handler heap memory 182. In either embodiment, the cached stateful context is updated within the cache 180. At operation 540, the hardware stateful engine 120 returns the updated stateful context to the HW steering engine(s) 194A, which are able to direct and process the network packet according to the updated stateful context.

In various embodiments, the integrated functioning between the hardware pipeline 105 and the programmable cores 150 may extend to any application written to function in a NIC or network adapter environment. For example, the hardware pipeline 105 can be configured to perform extended Berkeley Packet Filter (eBFP) acceleration. In these embodiments, code (e.g., part of the code 164) can be injected into a kernel of the Linux™ operating system from a non-privileged user to the privileged kernel under a number of constraints. Further, in other examples, the hardware pipeline 105 may be employed for tracing and performing tracking of the overall network processing pipeline (to include hardware and programmable aspects). In these embodiments, the hardware pipeline 105 may make up at least a portion of an eXpress Data Path (XDP). For example, the XDP is an eBPF-based high-performance data path used to send and receive network packets at high rates by bypassing most of the operating system networking stack. The XDP (e.g., hardware pipeline 105) may be merged in the Linux kernel since version 4.8 of Linux™, which is licensed as a GNU General Public License (GPL).

In various embodiments, and with a renewed focus on FIG. 1A, the cache 180 is operatively coupled to the hardware pipeline 105 of the network interface device 102. The cache 180 can store, for example, the programmable window 168 that is memory-mapped to the set of hardware structures 112 stored in the cache 110 of the hardware pipeline 105. The set of hardware structures 112 may be adapted to store a slice context, including data associated with processing a network packet that has been parsed by the hardware pipeline 105. The cache 110 may further be adapted to include the handler heap memory 182 to store a stateful context associated with an application to be executed by a hardware thread to aid in processing the network packet. The cache 180 may further store a scheduler array 186 to buffer jobs in an order to be executed.

In at least some embodiments, the scheduler 170 is coupled with the cache 180 and the hardware pipeline 105 of the network interface device 102. In these embodiments, the scheduler 170 receives an action request being populated with indicator data and triggers, upon detecting the indicator data, the hardware thread to execute the application to perform a job. The job, when executed by the programmable cores 150, generates contextual data associated with a packet-processing action of the hardware pipeline 105. The scheduler 170 may further update, using the contextual data, the data of the slice context via the programmable window 168.

In some embodiments, the scheduler 170 further receives a request from the dispatcher engine 130 of the hardware pipeline 105 for an available hardware thread and sends an identity of the hardware thread to the dispatcher engine 130, where the identity is included in the indicator data. In some embodiments, the scheduler 10 further coordinates execution of the job by the hardware thread by mapping entries of the scheduler array 186 onto an address space of the hardware thread. The scheduler 170 may further track execution progress of the entries in the scheduler array and report the hardware thread is free upon completion of the jobs scheduled for the hardware thread to execute.

In at least some embodiments, at least some of the handler code 144 is stored in the cacheable IO 160 (e.g., as the code 164) and includes triggering code. In these embodiments, the triggering code is executable to: receive, from the scheduler 170, the job to be performed; retrieve the stateful context from the handler heap memory 182; and trigger the application to be executed with the stateful context.

In various embodiments, the scheduler 170 further requests the hardware pipeline 105 to perform, on behalf of the programmable core 150, an operation associated with processing the network packet. In some embodiments, the operation is to perform one of inserting bytes into the network packet, removing bytes from the network packet, performing a cyclic redundancy check (CRC) computation of the network packet, generating a digest of the network packet, or performing a match operation with information derived from the network packet. At least one of the hardware thread or the hardware pipeline 105 may use the results of the operation to further processing the network packet, including performing steering of the network packet.

P4 is a domain-specific language for describing how packets are processed by a network data plane. A P4 program includes an architecture, which describes the structure and capabilities of the hardware pipeline 105, and a user program, which specifies the functionality of the programmable blocks within that pipeline. In various embodiments, the hardware pipeline 105 is also made available for performing a P4 offload of functionality. The P4 offloading can include defining the parser engines 192, the flow DS engines 194, the flow data structures 212, and the actions to be performed in response to finding a match within the flow data structures 212. In some embodiments, the programmability is performed through software primitives to perform networking efficiently. A compiler may be adapted to compile the code for the P4 program(s) to device-specific code for hardware of the network device 100. In some embodiments, the P4 program(s) are mapped from match-action tables, e.g., the flow data structures 212, to RISC-V code of the programmable cores 150.

By implementing the disclosed design of the network device 100, the programmable cores 150 may execute less code to run the operating system, e.g., something more akin to a running a micro-kernel. The code, therefore, can be pared down to mostly delegating work to the hardware pipeline 105 and the various hardware engines of the hardware pipeline 105.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device, a NIC, or an accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving a network packet into a hardware pipeline of a network device;
   parsing and retrieving information from the network packet;
   determining, by the hardware pipeline, a packet-processing action to be performed by matching the information to a data structure of a set of flow data structures;
   sending, by the hardware pipeline, an action request to a programmable core, the action request being populated with data to trigger the programmable core to execute a hardware thread to perform a job, which is associated with the packet-processing action and that generates contextual data;
   retrieving the contextual data updated by the programmable core; and
   integrating the contextual data into performing the packet-processing action.

2. The method of claim 1, wherein determining the packet-processing action further comprises determining multiple consecutive actions to be performed by matching the information to mutually-linking data structures of the set of flow data structures, the multiple consecutive actions associated with processing and forwarding the network packet.

3. The method of claim 1, further comprising:
   exposing, by the hardware pipeline, a slice context comprising the contextual data associated with processing the network packet;
   executing, by the programmable core, the hardware thread;
   performing updates, by the programmable core, to the slice context; and
   buffering, by the hardware pipeline, the slice context in a first cache of the hardware pipeline.

4. The method of claim 3, further comprising:
   loading, by the hardware pipeline, a target application into a second cache of the programmable core; and
   setting values within a set of registers of the programmable core, the values to cause the hardware thread to point to the target application and to the slice context.

5. The method of claim 3, wherein the contextual data within the slice context comprises at least one of:
   a program counter for a target application associated with the hardware thread; or
   a pointer to a stack associated with updating the slice context.

6. The method of claim 3, wherein the slice context comprises a packet headers buffer, which is readable and writeable by the programmable core, and at least one of:
   a parsed headers structure that is populated by a parser engine of the hardware pipeline and is readable by the programmable core;
   steering metadata associated with determining the packet-processing action from the information, the steering metadata being readable and writeable by the programmable core; or
   a plurality of parameters associated with performing the packet-processing action, the plurality of parameters being readable and writeable by the programmable core.

7. The method of claim 1, further comprising:
   requesting, by the hardware pipeline, the programmable core for an available hardware thread;
   loading, by the hardware pipeline, an application into a cache of the programmable core for execution by the hardware thread;
   exposing, within a cache of the hardware pipeline, a slice context, which comprises the contextual data; and
   setting, by the hardware pipeline, registers of the programmable core that causes the hardware thread to point to the application and the slice context.

8. The method of claim 1, further comprising:
   fetching, by a hardware stateful engine of the hardware pipeline, a stateful context from a handler heap memory of the programmable core;
   maintaining, by the hardware stateful engine, ordering of multiple jobs to be performed by the programmable core in performing the packet-processing action; and
   facilitating, by the hardware stateful engine, atomic updates to the stateful context and the ordering of the multiple jobs.

9. The method of claim 8, further comprising:
   scheduling, by a dispatcher engine of the hardware pipeline, a job to be performed by the programmable core; and
   requesting, by the dispatcher engine, that the hardware stateful engine perform at least one of locking one or more of the multiple jobs or ordering the multiple jobs to facilitate the atomic updates.

10. A network device:
    a set of port buffers to receive a network packet;

a programmable core; and
a hardware pipeline coupled to the set of port buffers and the programmable core, the hardware pipeline comprising:
 a cache to store a set of flow data structures that respectively correspond to multiple actions;
 a parser engine to parse and retrieve information from the network packet; and
 a set of hardware engines coupled to the cache and the parser engine, the set of hardware engines to:
  determine a packet-processing action to be performed by matching the information to a data structure of the set of flow data structures;
  send an action request to the programmable core, the action request being populated with data to trigger the programmable core to execute a hardware thread to perform a job, which is associated with the packet-processing action and that generates contextual data;
  retrieve the contextual data updated by the programmable core; and
  integrate the contextual data into performing the packet-processing action.

11. The network device of claim 2, wherein, to determine the packet-processing action, the set of hardware engines is further to determine multiple consecutive actions to be performed by matching the information to mutually-linking data structures of the set of flow data structures, the multiple consecutive actions associated with processing and forwarding the network packet.

12. The network device of claim 10, wherein the set of hardware engines is further to expose a slice context comprising the contextual data associated with processing the network packet, and wherein the programmable core is to execute the hardware thread and return updates to the slice context, which the hardware pipeline is to buffer in the cache.

13. The network device of claim 12, wherein the contextual data within the slice context comprises at least one of:
 a program counter for a target application associated with the hardware thread; or
 a pointer to a stack associated with updating the slice context.

14. The network device of claim 12, wherein the slice context comprises a packet headers buffer, which is readable and writeable by the programmable core, and at least one of:
 a parsed headers structure that is populated by the parser engine and is readable by the programmable core;
 steering metadata associated with determining the packet-processing action from the information, the steering metadata being readable and writeable by the programmable core; or
 a plurality of parameters associated with performing the packet-processing action, the plurality of parameters being readable and writeable by the programmable core.

15. The network device of claim 10, wherein the set of hardware engines comprises a dispatcher engine configured to:
 request the programmable core for an available hardware thread;
 load an application into a cache of the programmable core for execution by the hardware thread;
 expose a slice context within the cache comprising the contextual data; and
 set registers of the programmable core that cause the hardware thread to point to the application and the slice context.

16. The network device of claim 10, wherein the set of hardware engines comprises a hardware stateful engine configured to:
 fetch a stateful context from a handler heap memory of the programmable core;
 maintain ordering of multiple jobs to be performed by the programmable core in performing the packet-processing action; and
 facilitate atomic updates to the stateful context and the ordering of the multiple jobs.

17. The network device of claim 16, wherein the set of hardware engines further comprises a dispatcher engine coupled to the hardware stateful engine and configured to:
 schedule a job to be performed by the programmable core; and
 request that the hardware stateful engine perform at least one of locking one or more of the multiple jobs or ordering the multiple jobs to facilitate the atomic updates.

18. A programmable core comprising:
 a first cache operatively coupled to a hardware pipeline of a network interface device, the first cache to store:
  a programmable window that is memory mapped to a set of hardware structures stored in a second cache of the hardware pipeline, the set of hardware structures to store a slice context comprising data associated with processing a network packet that has been parsed by the hardware pipeline;
  a handler heap memory to store a stateful context associated with an application to be executed by a hardware thread to aid in processing the network packet; and
  a scheduler array to buffer jobs in an order to be executed; and
 a scheduler coupled with the first cache and the hardware pipeline, the scheduler to:
  receive an action request being populated with indicator data;
  trigger, upon detecting the indicator data, the hardware thread to execute the application to perform a job, which generates contextual data associated with a packet-processing action of the hardware pipeline; and
  update, using the contextual data, the data of the slice context via the programmable window.

19. The programmable core of claim 18, wherein the scheduler is further to:
 receive a request from a dispatcher engine of the hardware pipeline for an available hardware thread; and
 send an identity of the hardware thread to the dispatcher engine, wherein the identity is included in the indicator data.

20. The programmable core of claim 18, wherein the scheduler is further to:
 coordinate execution of the job by the hardware thread by mapping entries of the scheduler array onto an address space of the hardware thread;
 track execution progress of the entries in the scheduler array; and
 report the hardware thread is free upon completion of the jobs scheduled for the hardware thread to execute.

21. The programmable core of claim 18, further comprising triggering code, the triggering code executable to:
 receive, from the scheduler, the job to be performed;

retrieve the stateful context from the handler heap memory; and trigger the application to be executed with the stateful context.

22. The programmable core of claim 18, wherein the scheduler is further to request the hardware pipeline to perform, on behalf of the programmable core, an operation associated with processing the network packet, wherein the operation is to perform one of inserting bytes into the network packet, removing bytes from the network packet, performing a cyclic redundancy check (CRC) computation of the network packet, generating a digest of the network packet, or performing a match operation with information derived from the network packet.

* * * * *